United States Patent [19]
Ouellette

[11] Patent Number: 5,611,647
[45] Date of Patent: Mar. 18, 1997

[54] DIVERTER FOR BOTTLE AIR CONVEYOR

[75] Inventor: Joseph F. Ouellette, Glendale, Mo.

[73] Assignee: Ouellette Machinery Systems, Inc., Fenton, Mo.

[21] Appl. No.: 292,079

[22] Filed: Aug. 17, 1994

[51] Int. Cl.⁶ .................................................. B65G 51/02
[52] U.S. Cl. ............................................. 406/88; 406/182
[58] Field of Search .............................. 406/1, 2, 86, 87, 406/88, 182

[56] References Cited

U.S. PATENT DOCUMENTS

| | | | |
|---|---|---|---|
| 3,081,877 | 3/1963 | Jakobs et al. | 210/293 |
| 3,174,806 | 3/1965 | Barber et al. | 406/182 |
| 3,477,764 | 11/1969 | Smith | 406/88 |
| 4,218,001 | 8/1980 | Vits | 226/97 |
| 4,284,370 | 8/1981 | Danler et al. | 406/86 |
| 4,437,612 | 3/1984 | Russ et al. | 239/556 |
| 4,500,229 | 2/1985 | Cole et al. | 406/88 |
| 4,822,214 | 4/1989 | Aidlin et al. | 406/86 |
| 4,938,636 | 7/1990 | Aidlin et al. | 406/31 |
| 5,028,174 | 7/1991 | Karass | 406/88 |
| 5,100,265 | 3/1992 | Mirkin | 406/86 |
| 5,102,118 | 4/1992 | Vits | 271/195 |
| 5,147,153 | 9/1992 | Aidlin et al. | 406/86 |
| 5,161,919 | 11/1992 | Smith et al. | 406/86 |
| 5,246,097 | 9/1993 | McCoy et al. | 406/183 X |

FOREIGN PATENT DOCUMENTS

| | | | |
|---|---|---|---|
| 2580609 | 10/1986 | France . | |
| 5-221515 | 8/1993 | Japan | 406/88 |
| WO90/10587 | 9/1990 | WIPO . | |

Primary Examiner—Andrew C. Pike
Attorney, Agent, or Firm—Howell & Haferkamp, L.C.

[57] ABSTRACT

An air conveyor conveys a stream of bottle containers along an input path and then selectively diverts bottles from the input stream into one of a plurality of output paths. The invention includes a diverter plate positioned between the input path and the output paths which is moveable for selectively connecting the input path with one of the plurality of output paths.

28 Claims, 7 Drawing Sheets

DIVERTER FOR BOTTLE AIR CONVEYOR

BACKGROUND OF THE INVENTION

The present invention pertains to improvements to an air conveyor of the type disclosed in U.S. Pat. No. 5,437,521, filed May 13, 1993, issued Aug. 1, 1995, assigned to the assignee of the present invention, and incorporated herein by reference. More particularly the present invention pertains to an air conveyor that conveys a stream of bottles along an input path and then selectively diverts bottles from the stream into one of two output paths.

An air conveyor is useful for the rapid transport of plastic bottles between work stations as, for example, between a storage station and a bottle-filling station. Typically, the known air conveyor includes a pair of flanges spaced to define an elongated slot between them, and a series of air ducts on opposite sides of the slot. Plastic bottles are formed with annular rims adjacent the tops of their necks. With the bottle necks extending through the slot and the rims overlying the spaced flanges, the bottles are suspended from the flanges and hang below the slot. Pressurized air from the ducts is directed in streams toward the bottles. The bottles move through the slot because of the force of the air streams against the bottles. Preferably, the bottles are conveyed in closely spaced succession.

In at least some of the conventional air conveyors, the air is directed through a plenum within a channel and against the tops of the bottles above their annular rims. This results in turbulence of air emerging through the elongated slot causing fluttering of the bottles and left to right wobbling as they are blown. Frequently, this wobbling will cause the bottles to wedge against one another.

The known air conveyors for plastic bottles are also deficient because once the bottles accumulate, the force of air required to move the slug (accumulated bottles) as a group must be high to overcome the drag. Therefore, the air pressure kept in the plenum is high enough to overcome the friction drag force of a slug should one occur. Consequently, as single or spaced bottles are conveyed by this high air pressure, their speed accelerates to a high velocity. This high acceleration and velocity is detrimental because the bottles collide at high speed with other bottles that have stopped or accumulated downstream potentially damaging the bottles. Conversely, if the force of air is reduced to prevent high acceleration of single bottles to prevent high speed impact, the reduced air flow will be inadequate to move the slugs (accumulated bottles).

In the prior art, much has been done in attempts to control the force of air to convey bottles at high speed yet avoid high speed impacts, such as modulation of the blower speed, which requires motor speed controls. However, reaction time in depleting the air stored in the plenum as well as in replenishing air blown within the plenum is rather slow compared to the more immediate response required in high speed production lines. In other prior art, louvers have been installed in the walls of the plenum in an effort to control the speed of single (random) bottles while applying greater force against the slugs. However, since accumulated slugs can and do occur randomly at any place along a given conveyor span, the complexity of such applications becomes neither economical nor practical.

SUMMARY OF THE INVENTION

An objective of this invention is to provide an air conveyor that, in a practical and economical manner, moves the bottles along the path between work stations at a generally constant speed and maintains a small generally constant space between adjacent bottles and automatically slows the speed of a conveyed bottle as it approaches one or more stalled or stopped bottles, thereby avoiding high speed impact of bottles. It is also an objective of the invention to provide a diverter in line with an input air conveyor and at least two output air conveyors where the diverter is automatically controlled to direct bottles conveyed along the input conveyor to one of the two output conveyors.

The air conveyor of the present invention can move plastic bottles at a substantially constant speed and automatically slow the speed of bottles as they approach stopped bottles or bottles moving at a slower speed. Moreover, the air conveyor apparatus of the invention can divert conveyed bottles from an input conveyor to one of two separate output conveyors.

The bottles conveyed by the apparatus of the invention are generally of the conventional type of plastic bottle used as a container for carbonated beverages and other types of beverages. The bottles usually have an upper throat opening that is usually threaded on its exterior for receiving a cap. As the bottle extends downwardly from the throat, it tapers outwardly along a neck to an annular shoulder defining the upper portion of the main receptacle or body of the bottle. An outwardly projecting annular rim or ring surrounds the bottle separating the threaded throat from the tapered neck. Plastic bottles of this type are provided in a variety of sizes and configurations.

The air conveyor apparatus of the present invention is basically comprised of an input air conveyor and at least a pair of separate, output air conveyors. A diverter assembly is positioned between the input conveyor and the pair of output conveyors. The diverter can be manually or automatically controlled to direct a stream of bottles conveyed in a downstream path by the input conveyor to either one of the two separate output conveyors for continued downstream travel of the stream of bottles.

The input and the two output air conveyors are constructed similar to each other and similar to the air conveyor disclosed in U.S. Pat. No. 5,437,521. However, the input and two output air conveyors of the present invention include several improvements over previous air conveyors. The air conveyors are constructed as channels having a top wall and pairs of laterally spaced downwardly depending sidewalls. Together, the top wall and sidewalls give the channel of the conveyor a general, inverted-U shaped configuration. An air plenum extends along the top of the channel top wall. A plurality of air ducts extend through the channel top wall and sidewalls. Each duct extends from and communicates with the interior of the conveyor plenum to a pair of port openings that exit the channel sidewalls into the interior volume of the channel. Laterally projecting flanges extend from the pair of channel sidewalls into the channel interior volume. Distal edges of the flanges are laterally spaced from and mutually oppose each other defining a slot of the air conveyor therebetween. The spacing between the flange edges defining the slot is sufficiently large to receive the neck of a bottle container therein with the annular rim of the bottle resting on the top surfaces of the opposed flanges and the body of the bottle suspended below the pair of flanges. A first port opening of each of the air ducts exits the channel sidewall in the interior of the channel below the pair of flanges. This first port opening ejects a jet of air transmitted through the air duct from the conveyor plenum. The jet of air is directed against the bottle container suspended from the flanges and forces the bottle container along the slot defined between the pair of flanges. The orientation of the first port opening relative to the conveyor slot is such that the jet of air ejected from the first port opening will cause the bottle suspended in the slot to be conveyed along the slot in a desired downstream direction.

The second port opening of the air duct exits the channel sidewall into the channel interior above the pair of flanges. The air duct communicating the interior of the conveyor plenum with the first port opening is specifically configured so that all of the air passed through the duct from the plenum exits the first port opening and is not directed to the second port opening. The specific configuration of each air duct creates a venturi effect in the duct that draws a vacuum pressure through the second port opening from the interior volume of the conveyor channel above the pair of flanges. This vacuum created in the channel interior volume above the flanges exerts an upward pulling force on the bottle container suspended from its annular ring in the slot and thereby reduces the friction drag of the portion of the container annular ring supported on the conveyor channel flanges. This reduction in friction drag enables the input and output conveyors of the invention to convey bottle containers at increased speeds while avoiding jamming of the bottle containers in the conveyors. The reduced friction force exerted by the bottle containers on the flanges of the conveyor also reduces wear on these flanges through use of the conveyor.

To further reduce the wear exerted on the flanges of the input and output conveyors of the invention and to also further increase the speed at which bottle containers may be conveyed by the conveyors, the support surfaces of the conveyor flanges that support the annular rings of the bottle containers have polymeric surfaces. In the preferred embodiment, the annular flanges that project from the conveyor channel sidewalls are coated with a polymer. This eliminates the need for polishing the surfaces of the flanges that support the annular rings of the bottle containers to reduce the friction of the supporting flange surfaces and thereby reduces the costs of manufacturing the conveyors.

The specific configuration of each air duct as it approaches the first port opening also causes a bottle conveyed by the first port openings along the slot of the conveyor to automatically decrease its conveyed speed as it approaches a stationary or slower moving bottle container in the conveyor. Each of the first port openings are oriented so that they direct a jet of air outwardly from the first port opening beneath the pair of conveyor flanges toward the sides of the bottle container suspended in the conveyor slot. The direction of the air jet from the first port opening is such that if the bottle container is slowed or stopped in the conveyor slot a portion of the air jet from the first port openings will be directed upwardly into the conveyor slot. This portion of the air jets from the first port openings directed into the conveyor slot negates a portion of the vacuum created in the conveyor interior volume above the slot due to the effect of the second port openings. As the vacuum in the channel interior above the slot is reduced, the friction force of the container annular rims supported on the top surfaces of the conveyor flanges is increased. This increase in the friction force of the container rims on the conveyor flanges automatically causes the conveyed bottle containers to decrease their conveyed velocity as they approach a slower moving or stopped bottle container in the conveyor.

The diverter plate assembly of the invention positioned between the input conveyor and the pair of output conveyors is basically comprised of a pair of directional slots formed in a plate with pluralities of nozzle heads arranged along opposite sides of the two directional slots. The diverter plate assembly includes a mechanism that can be automatically controlled or manually controlled to move laterally relative to the input conveyor and pair of output conveyors between first and second positions. In the first position of the diverter plate relative to the input and output conveyors, a first directional slot of the pair aligns with the input conveyor slot and a first approach slot that leads to the first output conveyor slot of the pair of output conveyors. In the second position of the diverter plate relative to the input and output conveyors, a second directional slot of the pair aligns with the input slot and a second approach slot that leads to the second output slot of the pair of output conveyors. By shifting the diverter plate laterally between its first and second positions relative to the input and output conveyors, the stream of bottle containers conveyed in an upstream direction along the input conveyor slot can be directed into either the first or second output conveyor slots as desired.

The diverter plate assembly includes a feed slot that receives the stream of bottle containers from the input conveyor. Pairs of pulley driven belts are positioned on opposite sides of the feed slot to engage with the bottle containers fed into the slot from the input conveyor. A first pair of pulley driven belts positioned on the opposite sides of the feed slot engage with the bottle containers fed into the feed slot from the input conveyor and create a desired spacing between adjacent bottles by decreasing the conveyed speed of the bottles received from the input conveyor holding back these bottles from the second set of belts. This first pair of belts then delivers the spaced bottle containers to the second pair of pulley driven belts positioned on opposite sides of the feed slot which travel at a faster speed than the first set of belts thereby creating a spacing between containers as they are transferred from the first set of belts to the second set. The second set of belts feed the properly spaced bottle containers to the diverter plate. A plurality of orientation air jets are positioned above and below the feed slot between the second pair of belt driven pulleys. These orientation jets eject jets of air that properly position the bottle containers with their necks positioned slightly forward of their bodies as the bottle containers are conveyed through the second set of belt driven pulleys to the diverter plate.

A pair of diverter nozzles are positioned on opposite sides and below the diverter plate. The pair of diverter nozzles assist the diverter plate in directing the stream of bottle containers received from the input conveyor to one of the two output conveyors. The diverter nozzles are positioned to selectively eject jets of air in opposite lateral directions. The ejected jets of air from the nozzles impinge on the opposite lateral sides of a bottle container as it exits one of the two directional slots of the diverter plate and enters approach slots to one of the two output air conveyors. The jet of air hitting the bottle orients or positions the bottom of the bottle body toward the approach slot leading to the output conveyor and thereby assists in the transfer of the bottle container from the diverter plate to the downstream air conveyor.

BRIEF DESCRIPTION OF THE DRAWINGS

Further objects and features of the present invention are revealed in the following detailed description of the preferred embodiment of the invention and in the drawing figures wherein:

FIGS. 7, 8 and 9 show specific structural features of one embodiment of the air conveyor of the invention; FIG. 8 is taken at section line 8—8 in FIG. 7; and FIGS. 10, 11, and 12 show specific structural features of a further embodiment of the air conveyor of the invention; FIG. 11 is taken at section line 11—11 in FIG. 10.

DESCRIPTION OF THE PREFERRED EMBODIMENTS

Figure 1:
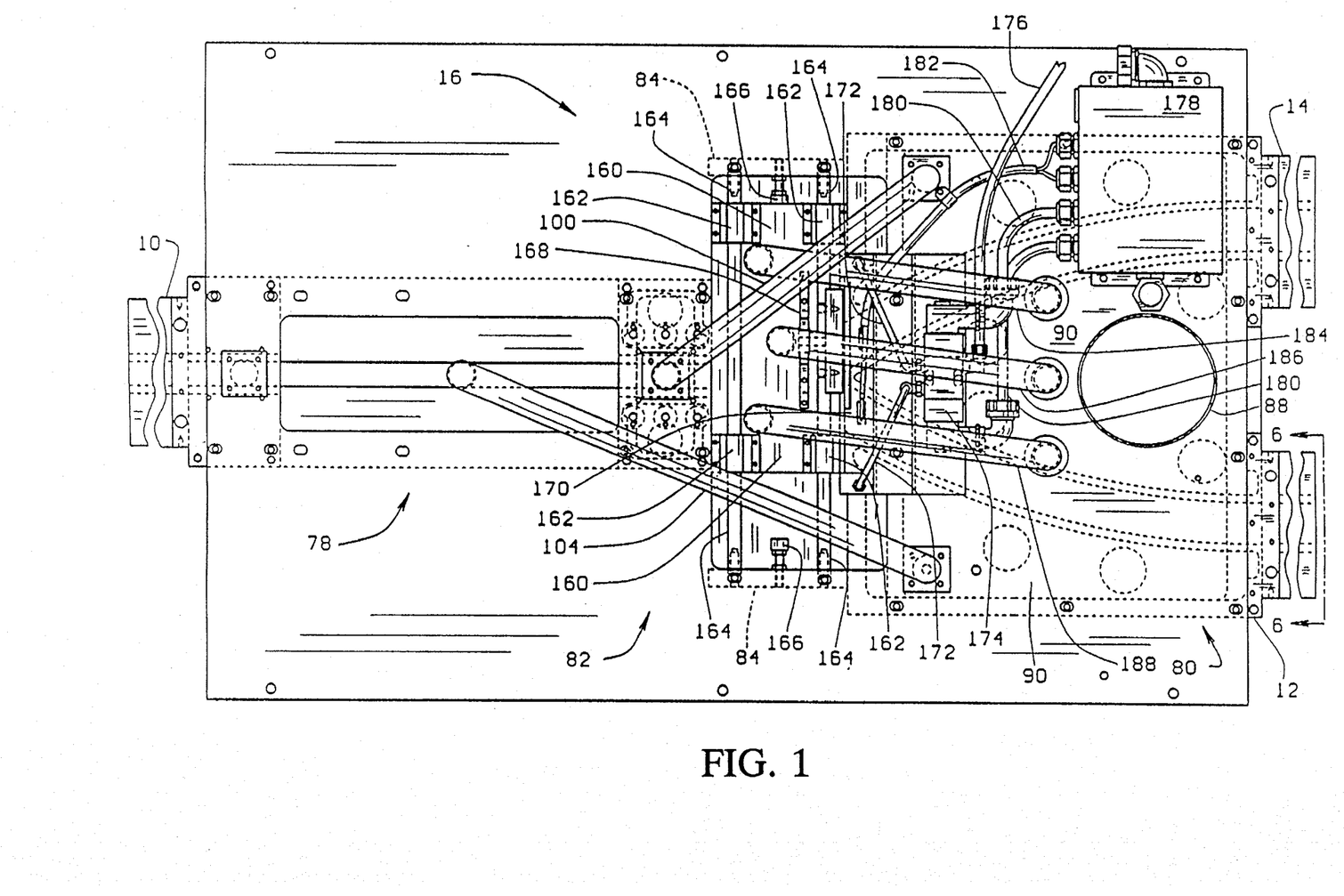
FIG. 1 is a top elevation view of the conveyor apparatus of the invention including the input air conveyor, the diverter assembly, and the pair of output air conveyors.
Figure 2:
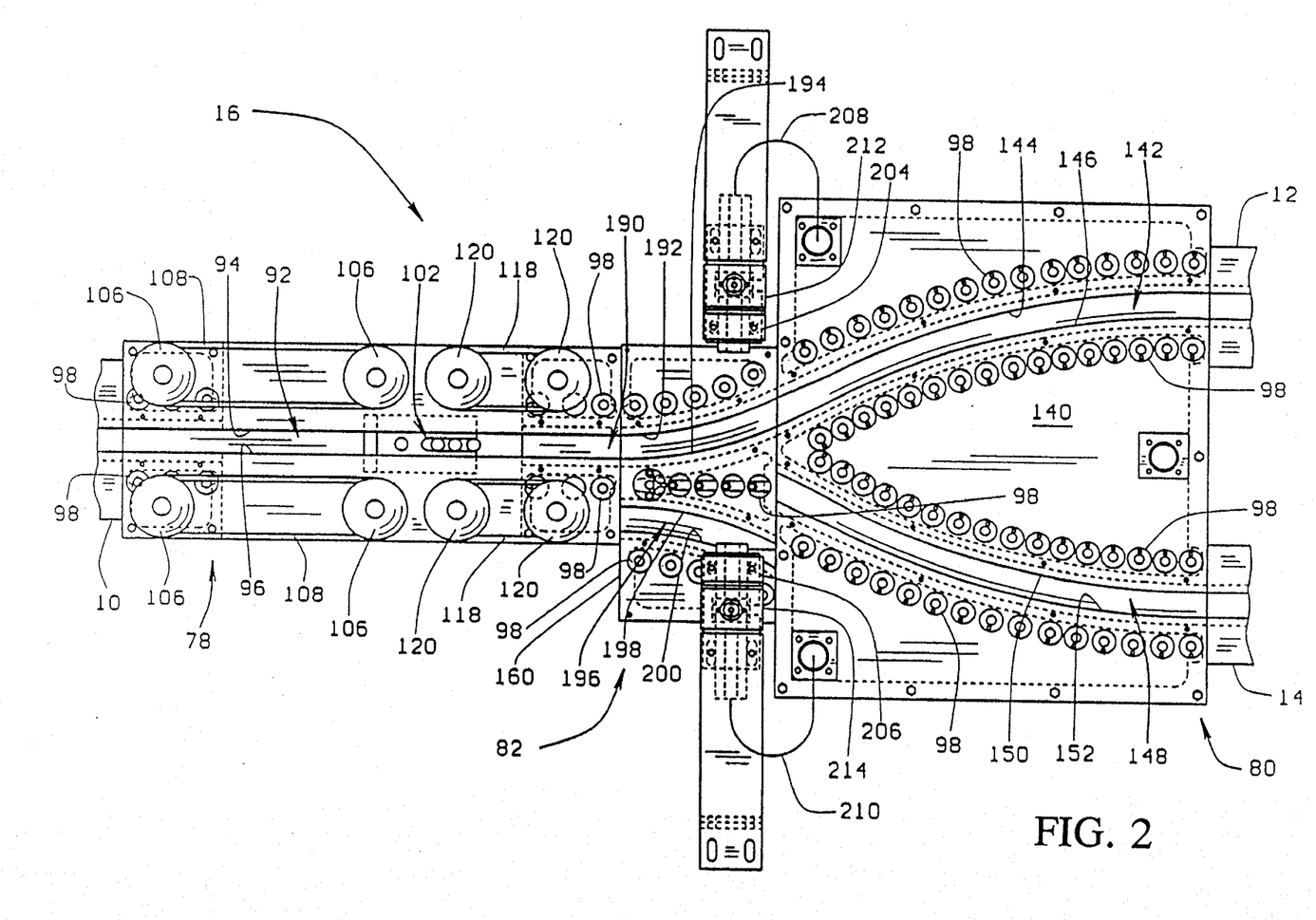
FIG. 2 is a bottom plan view of the diverter assembly.

The air conveyor apparatus of the present invention is an improvement over air conveyors of the type disclosed in co-pending U.S. patent application Ser. No. 08/062,939, filed May 13, 1993, issued Aug. 1, 1995 as U.S. Pat. No. 5,437,521, assigned to the assignee of the present invention, and incorporated herein by reference. The apparatus of the invention is basically comprised of an input air conveyor 10, a first output air conveyor 12, a second output air conveyor 14, and a diverter assembly 16 positioned between the input conveyor 10 and the two output conveyors 12, 14. It should be understood that the diverter assembly of the invention may be employed with other types of air conveyors currently known in the prior art. Each of these basic component parts of the invention is shown in their relative positions in FIGS. 1 and 2 of the drawing figures. In FIGS. 1 and 2, the air input conveyor 10 and output air conveyors 12, 14 are shown as schematic representations for simplicity. The lengths of these three conveyors are also shown truncated in FIGS. 1 and 2. It should be understood that the overall length of the input air conveyor 10 and two output air conveyors 12, 14 can vary depending upon the environment in which the apparatus of the invention is employed. In certain situations, it may be necessary that the input air conveyor be longer than the two output air conveyors or vice versa. Furthermore, in other situations, it may be necessary that the two output air conveyors have different overall lengths. It should be understood that the construction of the input air conveyor 10 and the two output air conveyors 12, 14 are identical and certain structural features of these conveyors repeat along the lengths of these conveyors. Therefore, a description of only a short length of one of the conveyors is necessary for an understanding of how any length would be constructed and operated. Furthermore, the drawings of the diverter assembly 16 show component parts of the assembly in schematic representation as well as truncated depictions to simplify the drawings and reduce clutter while still providing a sufficient description of the subject matter of the invention that would enable the ordinary skilled artisan to make and use the same.

Figure 6:
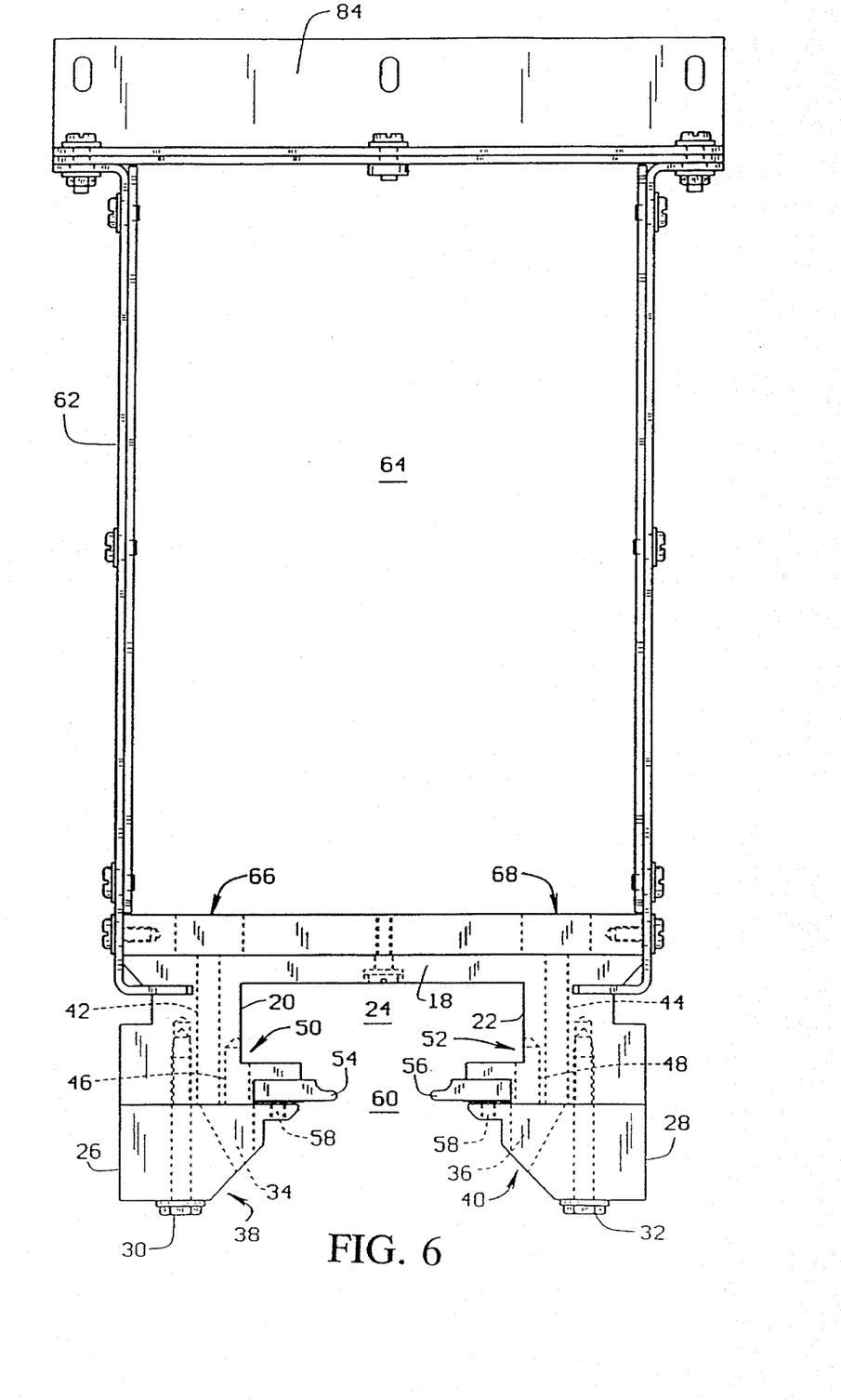
FIG. 6 is an end view of the construction of the input and pair of output air conveyors taken at line 6—6 in FIG. 1.
Figure 7:
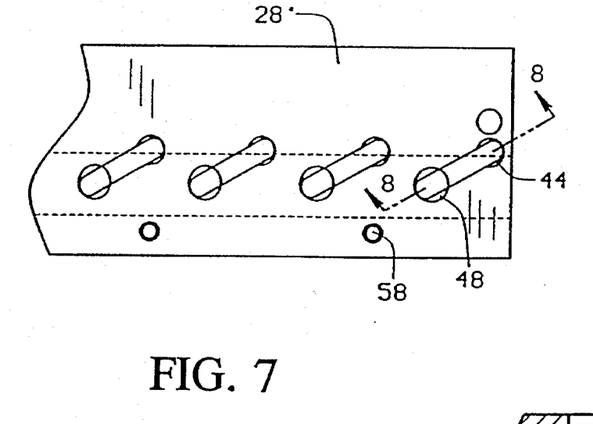
Figure 8:
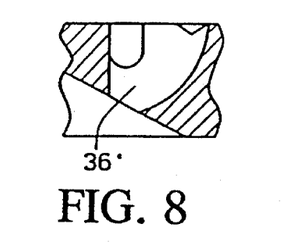
Figure 9:
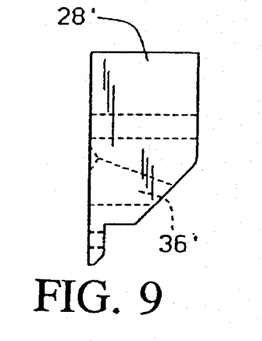
Figure 10:
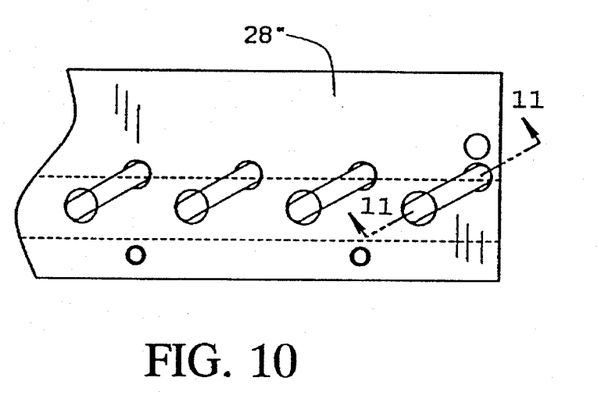
Figure 11:
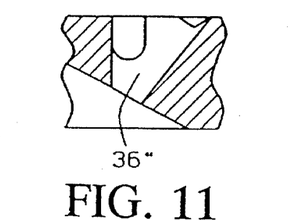
Figure 12:
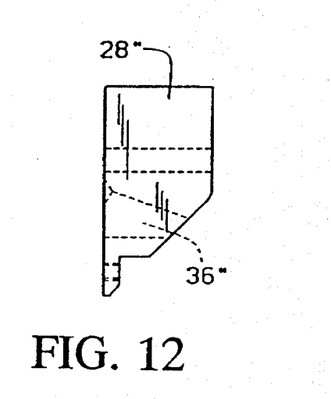

Referring now to the construction of the air conveyors of the present invention, as stated earlier, the construction of the input air conveyor 10 and the first and second output air conveyors 12, 14 is similar and only one of the air conveyors, the first output air conveyor 12, will be described in detail. FIG. 6 shows an end view of the output air conveyor 12. The conveyor includes a conveyor channel having a top wall 18 and laterally spaced sidewalls 20, 22. As seen in FIG. 6, together the top wall 18 and sidewalls 20, 22 have a general, inverted-U shaped configuration surrounding an interior volume 24 of the conveyor channel. The sidewalls 20, 22 of the conveyor channel have lower sections 26, 28, respectively, connected to the upper portions of the sidewalls by threaded fasteners 30, 32. The two lower sections of the sidewalls 26, 28 have lower portions 34, 36 of pluralities of air ducts that extend through the conveyor channel sidewalls. FIGS. 7–9 show one embodiment of the lower duct portion with the lower section of the sidewall referenced as 28' and the lower portion of one of the plurality of air ducts referenced as 36'. FIG. 8 shows the cross section configuration of one of the duct lower portions 36'. FIGS. 10–12 show a variant embodiment of the lower duct portion with the lower section referenced as 28" and the lower portion of one of the plurality of air ducts referenced as 36". FIG. 11 shows the variant embodiment of the duct lower portion having a different configuration. The configurations of the duct lower portions are similar in that they direct jets of air out through jet port openings 38, 40 of the air ducts that strike bottle containers conveyed by the air conveyor in the area of the shoulder of the containers forcing the containers to travel downstream along the length of the air conveyor.

Each of the lower portions of the air ducts 34, 36 are fed with pressurized air conveyed through upper portions of the ducts 42, 44 that extend through the upper portions of the conveyor channel sidewalls 20, 22. As seen in FIG. 6, these upper portions 42, 44 of the air ducts extend from the top surface of the conveyor channel top wall 18 completely through the channel sidewalls 20, 22 to the duct lower portions 34, 36.

Branch portions 46, 48 of the air ducts extend partially through the upper portions of the sidewalls 20, 22 and exit the sidewalls into the conveyor channel interior 24 through vacuum port openings 50, 52. These branch portions of the air duct 46, 48 communicate with the duct lower portions 34, 36. As pressurized air passes through the air ducts 42, 44 in the sidewalls and then through the lower duct portions 34, 36 exiting the jet port openings 38, 40, a venturi effect is created in the duct lower portions 34, 36 that draws a suction through the branch portions 46, 48 that exit the sidewalls at the vacuum openings 50, 52 in the channel interior volume 24. This suction reduces the air pressure in the upper portion of the channel interior volume 24.

The channel interior volume 24 is divided into an upper portion and a lower portion by a pair of laterally projecting flanges 54, 56 that extend from the pair of channel sidewalls 20, 22 into the channel interior volume 24. As seen in FIG. 6, the flanges 54, 56 are held securely in their positions in the interior of the conveyor channel by a plurality of set screws 58. The opposed distal edges of the flanges are laterally spaced from each other defining a slot 60 of the air conveyor therebetween. The lateral width of the slot 60 is sufficiently large to receive the neck of a bottle container therein with the annular rim of the bottle supported on the top surfaces of the opposed flanges 54, 56 and the body of the bottle suspended below the pair of flanges. In the preferred embodiment of the invention, at least the top support surfaces of the pair of flanges 54, 56 that come into contact with the annular ring of a bottle container supported by the flanges are coated with a polymeric material such as TUFRAM® or NEDOX®, which are registered trademarks of General Magnaplate Corporation for metal coatings. Other types of polymer coatings may be employed. Polymer coatings of this type protect the base metal of the flanges 54, 56 from wear over use of the air conveyor and also provide a slick support surface on the flanges that has less friction resistance to the conveyance of the bottle container annular rings thereover than does a polished metal surface such as polished stainless steel.

An air plenum 62 extends along the top wall 18 of the conveyor channel. The interior 64 of the plenum communicates through pluralities of openings 66, 68 in the bottom of the plenum with the pluralities of air ducts 42, 44 spatially arranged along the length of the conveyor channel and the conveyor slot 60. Air is supplied at a regulated pressure to the plenum interior volume 64 by a conventional blower (not shown). The air pressure supplied to the plenum interior is directed through the plenum openings 66, 68 and the sidewall air ducts 42, 44 and is ejected from the jet port openings 38, 40. The jets of air ejected from the port openings 38, 40 cause the bottle suspended in the slot 60 to be conveyed along the slot in a desired downstream direction. The venturi effect created in the air ducts draws a vacuum pressure through the vacuum port openings 50, 52 which open into the interior volume 24 of the conveyor channel above the pair of flanges 54, 56. This vacuum created in the channel interior volume above the flanges exerts an upward pulling force on the bottle container suspended from its annular ring in the slot and thereby reduces the friction drag of the portion of the bottle annular ring supported on the conveyor channel flanges 54, 56. This reduction in friction drag enables the input and output conveyors of the invention to convey bottle containers at increased speeds while avoiding jamming of the bottle containers in the conveyors. The reduced friction force exerted by the bottle containers on the flanges of the conveyor also reduces wear on these flanges.

The specific configuration of each air duct as it exits the jet port openings 38, 40 also causes a bottle container conveyed by the jet port openings along the slot of the conveyor to automatically decrease its conveyed speed as it approaches a stationary or slower bottle container moving along the slot of the conveyor. The jet port openings 38, 40 are oriented so that they direct a jet of air outwardly beneath the pair of conveyor flanges 54, 56 towards the shoulder areas of the bottle container suspended in the conveyor slot. The direction of the air jet from the jet port openings is such that if a bottle container is slowed or stopped in the conveyor slot, portions of the air jets from the jet port openings 38, 40 will be directed against the shoulder area of the stopped bottle container and will be directed by the shoulder area upwardly into the conveyor slot 60. This portion of the air jets from the jet port openings that is directed into the conveyor slot 60 negates a portion of the vacuum created in the conveyor interior 24 above the flanges 54, 56 in the area of the stopped bottle container. As the vacuum in the channel interior volume 24 above the slot in the area of the stopped bottle is reduced, the friction force of a second bottle container annular ring supported on the flange top surfaces and approaching the stopped bottle is increased. This increase in the friction force of the approaching bottle container rim on the conveyor flanges automatically causes the conveyed bottle container to decrease its conveyed velocity as it approaches the stopped bottle container in the conveyor. In this manner, the air conveyors of the present invention automatically control the speed of conveyed bottle containers to avoid high speed impact of a moving bottle container with a stopped or slower moving bottle container.

The bottle container diverter that receives bottles from the input air conveyor and diverts these bottles to the first and second output air conveyors is shown in FIGS. 1–5 of the drawing figures. The diverter is basically comprised of three sections, a feed section 78 that receives the bottle containers from the input air conveyor 10, an output conveyor approach section 80 that delivers bottle containers to the two output conveyors 12, 14, and a diverter section 82 positioned between the feed section and the output conveyor approach section which either selectively or automatically diverts bottles received from the input air conveyor 10 to the two output air conveyors 12, 14. Like the input and output air conveyors, the component parts of the diverter assembly 16 are all supported on a frame 84 that provides easy access to the component parts for servicing or adjustment.

The feed section, diverter section, and output conveyor approach section all have pluralities of air jet nozzles that eject jets of air to convey pluralities of bottle containers through the three sections. The supply of air is provided by a large blower 86 that is mounted on top of the frame 84. The blower 86 communicates through a large hose 88 with a manifold housing 90 mounted on the frame. Pluralities of hoses, shown schematically in the drawings for simplicity and to reduce clutter, distribute the air from the manifold 90 to the various areas of the diverter assembly.

Referring to FIG. 2 which shows the underside of the diverter assembly 16, the feed section 78 of the assembly includes a slot 92 between opposed flanges 94, 96. The slot, in cross section, is configured very similar to the slot of the air conveyors except that it does not include the vacuum port openings or jet port openings of the air conveyors. Pluralities of air jet heads 98 are positioned on opposite sides of the slot 92. The construction of these air jet heads 98 is similar to that disclosed in U.S. Pat. No. 5,437,521, referenced earlier. However, in the preferred embodiment of the invention, the air jet heads 98 differ from those disclosed in the referenced U.S. Pat. No. 5,437,521 in that the jet openings of the heads are directed radially outward from the center of the cylindrical heads and do not have a downward directed component. Each of the jet openings of the heads 98 in the feed section 78 of the diverter assembly are directed toward the slot 92 but are angled slightly so they are also directed upstream, or from left to right as viewed in FIG. 2, to convey bottle containers through the slot 92 in the upstream direction. The six heads 98 positioned on opposite sides of the slot 92, adjacent the diverter section 82, are supplied with pressurized air through the hose 100 shown in FIG. 1 that communicates with the manifold 90. The six heads shown further downstream along the slot 92 may also be supplied with pressurized air from the manifold 90 or alternatively may be supplied with air from another source.

Positioned in the center of the slot 92 and above the slot so as not to interfere with the passage of the bottle container throats through the slot are three additional air jets 102. These jets are supplied with pressurized air through the hose 104 communicating with the manifold 90. These three jets positioned above the slot 92 direct jets of air downward on the throats of the bottle containers conveyed through the slot to ensure that the bottle containers reaching this point in the feed section 78 are properly positioned in the slot with their annular rims supported on the top surfaces of the flanges 94, 96 and are not raised up from the flanges. This is important for proper engagement of feed belts on the opposite sides of the conveyed bottle containers as will be described.

The feed section 78 of the diverter assembly also comprises two separate pairs of belt and pulley assemblies. The first pair are spacing pulleys 106 and belts 108 at the upstream end of the feed slot 92. The pulleys 106 are driven by motors 110 through quick clutch mechanisms that control and quickly change the speed of rotation of the pulleys 106 as needed to produce a desired spacing between adjacent bottle containers conveyed through the feed slot 92 by holding back the stream of conveyed bottles. The pulleys 106 are mounted on shafts 114 that are driven from the clutch mechanism 112 through transmissions 116 and 122.

Figure 3:
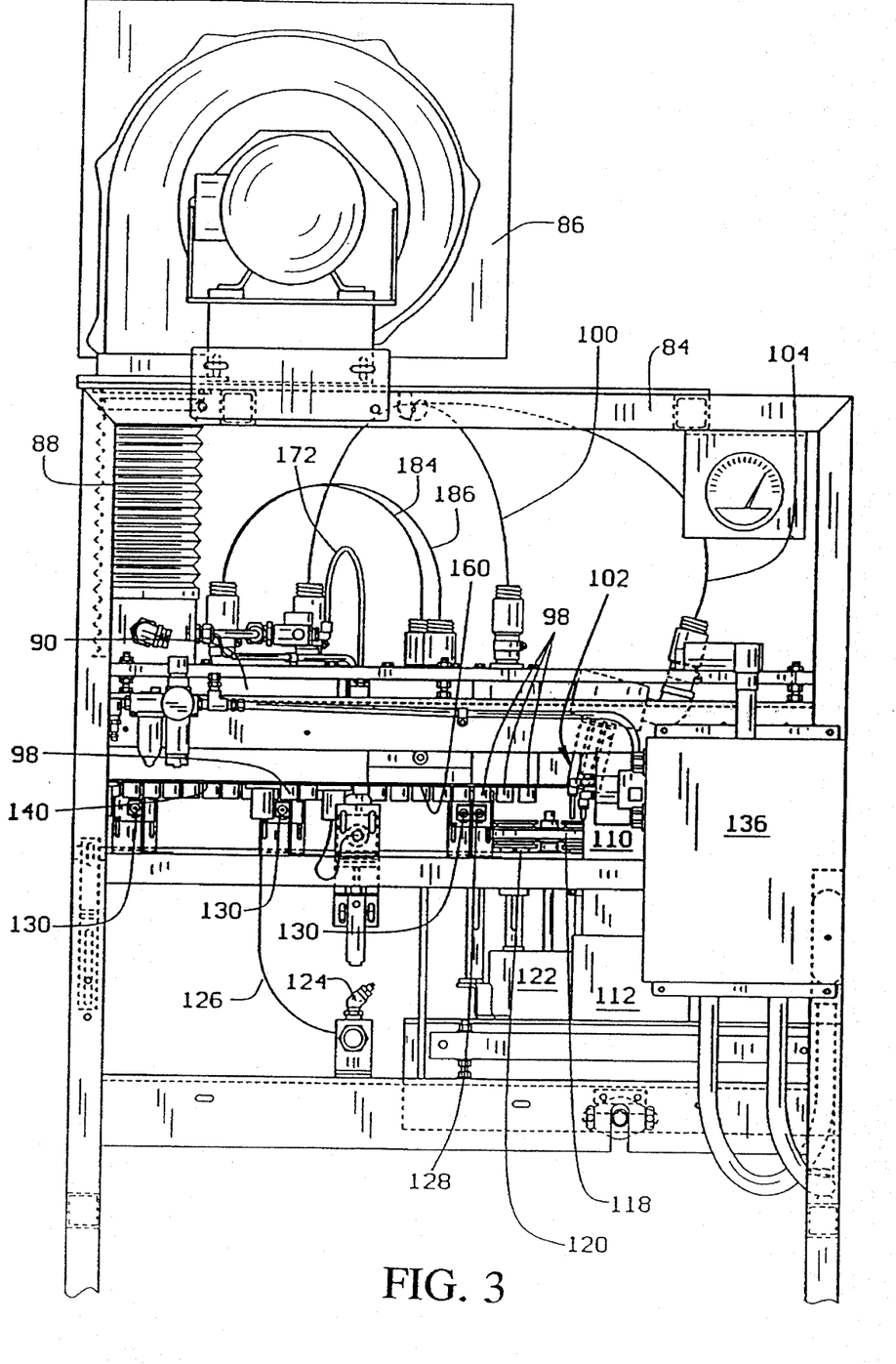
FIG. 3 is a left side elevation view of the diverter assembly.
Figure 4:
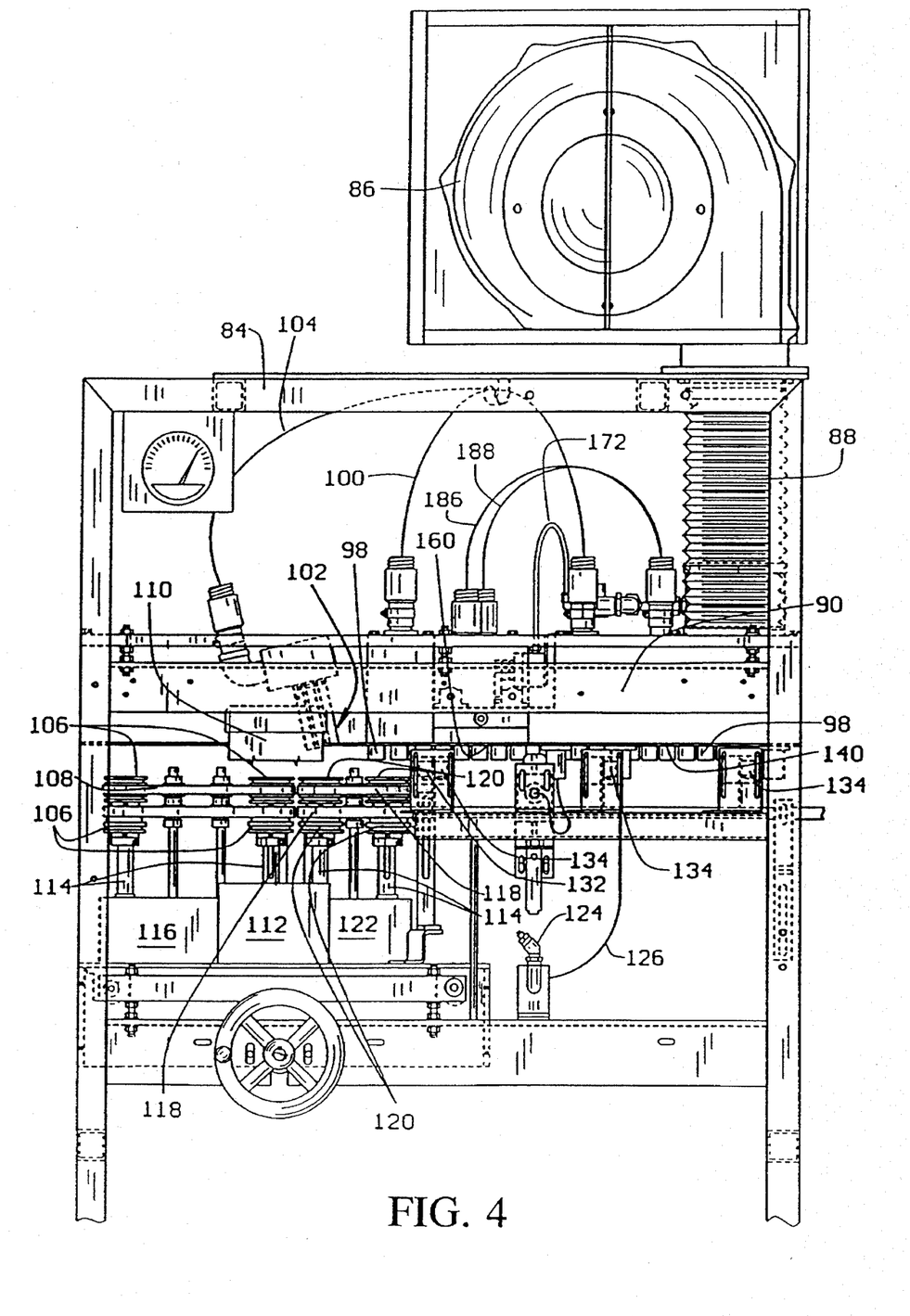
FIG. 4 is a right side elevation view of the diverter assembly.
Figure 5:
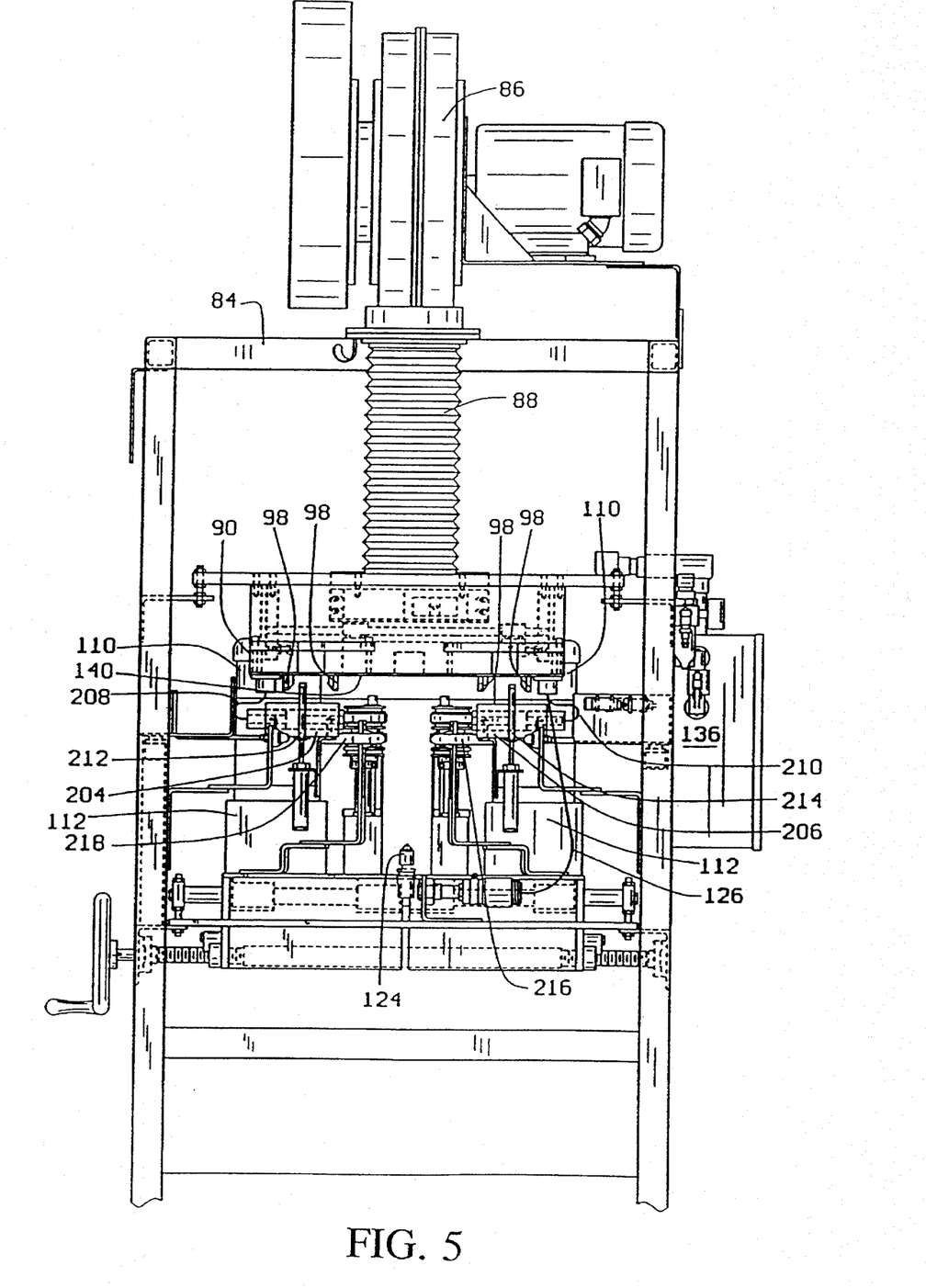
FIG. 5 is an end elevation view of the diverter assembly looking upstream of the conveyed path of bottle containers.

As best seen in FIGS. 3 through 5, each shaft is provided with a plurality of pulleys 106. The plurality of pulleys 106 provided on each shaft 114 enables the vertical positions of the belts 108 to be adjusted by positioning the belts over different pairs of pulleys positioned in different horizontal planes. This enables the feed section 78 of the diverter assembly to be used with bottle containers having a variety of different shaped bodies. By adjusting the horizontal position of the belts 108 by looping the belts over different pairs of pulleys 106, the feed section of the diverter assembly can be adapted for use with a variety of different bottle containers having different configurations.

As the bottles are conveyed through the slot 92 and exit from between the spacing pulleys 106 and belts 108 they are next engaged by the pair of feed belts 118 and pulleys 120. This pair of belts 118 conveys the bottle containers through the remainder of the feed slot 92 and delivers the containers to the diverter section 82 of the assembly 16. The constant speed of the feed pulleys and belts is determined depending on the desired speed at which the plurality of bottle containers are to be moved through the diverter assembly 16. The position of the feed belts on the pulleys may also be adjusted in the same manner as the spacing belts.

As best seen in FIGS. 3–5, an air jet 124 is positioned below the diverter section 82 with its jet directed rearward or in an upstream direction toward the feed slot 92. The lower air jet 124 is fed with pressurized air from the manifold 90 through a hose 126, shown schematically. The jet of air ejected from this lower air jet 124 together with the jets of air ejected from the upper air jets 102 properly orient the bottle containers conveyed through the feed slot prior to their ejection from the feed slot into the diverter section 82 of the assembly. These jets of air orient the bottle containers in the feed slot 92 with the throat or top of the bottle containers oriented slightly forward or downstream of the bodies or bottom portions of the containers. It has been found that this particular orientation of the bottle containers as they enter the diverter section 82 of the assembly prevents jamming of the containers in the diverter section.

A pair of photosensors 128, 130 are mounted on the left side of the frame 84 at the end of the feed slot 92 just prior to entry to the diverter section 82 of the assembly. A pair of reflectors 132, 134 are positioned on the right side of the frame opposite the photosensors 128, 130, respectively. The first photosensor 128 and its associated reflector 132 are employed in counting and timing the bottle containers as they exit the feed slot 92. This photosensor communicates electronically with a control panel 136 of the diverter assembly which in turn communicates electronically with a computerized control (not shown) which monitors the rate at which bottle containers exit the feed slot 92 and the spacing between adjacent containers as they exit the slot. With the information provided by the photosensor 128 and its associated reflector 132, the controls 136 of the diverter assembly 16 can automatically maintain a constant preprogrammed rate at which bottle containers exit the feed slot and enter the diverter section 82 as well as the spacing between adjacent containers. Alternatively, if desired, manual input to the controls 136 can vary the rate and spacing of the bottle containers. The adjacent photosensor 130 and its associated reflector 134 communicate electronically with the control panel 136 to monitor whether a jam of bottle containers occurs at the entry to the diverter section 82 of the assembly. Similar photosensors 130 and their associated reflectors 134 are also positioned along the flow path of bottle containers through the diverter section 82 and the output conveyor approach section 80 to determine if jams of bottle containers occur at these positions along the flow path of the containers. With a jam detected anywhere along the flow patch of containers through the diverter assembly 16, the controls 136 can automatically shut down the assembly so that the jam can be corrected.

The output approach section 80 of the diverter assembly 16 is basically comprised of a plate 140 supported on the frame 84 below the air manifold 90. The plate 140 has a first output approach slot 142 formed therein with pairs of flanges 144, 146 on opposite sides of this first slot. The slot 142 and its opposed flanges 144, 146 are constructed in substantially the same manner as the slots disclosed in U.S. Pat. No. 5,437,521, referenced earlier. A second output approach slot 148 is also formed in the plate 140. This second slot 148 also has an opposed pair of flanges 150, 152 that are constructed in the same manner as the first output approach slot. The two output approach slots 142, 148 lead from the diverter section 82 of the diverter assembly 16 to the output air conveyors 12, 14 with the first approach slot 142 leading to the first output air conveyor 12 and the second output approach slot 148 leading to the second output air conveyor 14. The approach slots 142, 148 are aligned on their opposite sides with pluralities of air jet heads 98 which are substantially the same as the air jet heads disclosed in U.S. Pat. No. 5,437,521, except that their air jet openings are directed radially from the cylindrical configurations of the air jet heads and there is no downward component of the air jets ejected from the heads. Each of the air jet heads 98 along the slots 142, 148 are oriented so that the air ejected from the heads conveys the bottle containers received from the diverter section 82 of the assembly along the slots to the two output air conveyors 12, 14. With each of the air jet heads 98 of the output approach section 80 connected to the underside of the manifolds 90, they receive their supply of pressurized air directly from the manifold.

The diverter section 82 of the assembly includes a diverter plate 160 having four cylindrical slide bushings 162 mounted to its top surface. Each of the slide bushings 162 are in turn mounted on a pair of parallel slide rods 164 that are secured at their opposite ends to the assembly framework 84. The slide rods 164 extending through the bushings 162 enable the diverter plate 160 to slide laterally across the rods 164. Abutments 166 are mounted to the assembly frame 84 and limit the extent to which the diverter plate 160 can slide. In the preferred embodiment of the invention, the total length of travel of the diverter plate 160 along the slide rods 164 is three inches. A bracket 168 is mounted to the top of the diverter plate 160 and is connected to a slide piston (not shown) contained inside a pneumatic cylinder assembly 170. A pair of piping sections 172 connect the opposite ends of the pneumatic cylinder assembly 170 to an electrically operated valve housing 174. The valve housing 174 is supplied with its own source of air pressure through the hose 176. The housing is also connected to a valve control box 178 by wiring 180. Feedback wiring 182 is also connected between the valve control box 178 and the cylinder assembly 170 providing the control box 178 with information on the instantaneous position of the piston (not shown) in the cylinder housing. The valve housing 174 is controlled by signals received from the control box 178 to selectively supply pressurized air from a supply hose 176 through one of the two piping sections 172 to one side of the cylinder housing while evacuating air from the opposite side of the cylinder housing through the other piping section. This selective supply of air to the opposite sides of the cylinder housing also supplies pressurized air to the opposite sides of the piston contained in the housing, causing the piston to reciprocate through the cylinder. On reciprocating movement of the piston in the cylinder, the bracket 168 is also reciprocated along the exterior of the cylinder housing 170 and, in turn, the diverter plate 160 connected to the bracket is reciprocated along the slide rods 174 between first and second positions of the plate relative to the rods. In the first position of the plate 160 relative to the rods 164, the topmost abutment 166 shown in FIG. 1 engages against the side of the plate 160 and the plate is properly positioned relative to the feed section 78 and the output approach section 80 of the diverter assembly to divert container bottles from the feed section to the first output approach slot 142 of the output approach section 80. By operation of the valve housing 174 to reverse the supply of pressurized air to the cylinder housing 170 so that the air is supplied to the top of the cylinder housing as viewed in FIG. 1 and evacuated from the bottom of the housing, the piston in the housing is caused to travel downward as viewed in FIG. 1 causing the diverter plate 160 to slide along the rods 164 to its second position where the edge of the plate will engage with the lower abutment 166 shown in FIG. 1. In this second position of the diverter plate, it routes bottle containers from the feed section 78 of the diverter assembly to the second output approach slot 148 of the output approach section 80 of the assembly. The operation of the valve housing 174 selectively supplying and/or evacuating air to the two piping sections 172 communicating with the cylinder housing 170 is controlled by the control box 178 and may be automatically controlled or manually overridden.

The diverter plate 160 is hollow and acts as a plenum that supplies air pressure to a plurality of air jet heads 98 mounted to the underside of the plate. The air jet heads 98 mounted to the underside of the plate are arranged in three sections and three supply hoses 184, 186, 188 extend from the manifold 90 to the top of the diverter plate 160 and supply pressurized air to these three sections of air jet heads 98. Referring to FIG. 2 which shows the underside of the diverter plate 160, it is seen that the plate includes a first directional slot 190 having opposed flanges 192, 194 for supporting the annular ring of a bottle container, and a second directional slot 196 with similar opposed flanges 198, 200. The first and second directional slots 190, 196 are constructed in the same manner as the output approach slots 142, 148 and the air jet heads 98 that line the opposite sides of the directional slots 190, 196 are also constructed in the same manner as the air jet heads 98 lining the output approach slots 142, 148. From FIG. 2, it can be seen that when the diverter plate 160 is controlled by the valve housing 174 and its control box 178 to move to its first position relative to the slide rods 164 supporting the plate, the first directional slot 190 is aligned with the feed slot 92 and the first output approach slot 142. In this position of the diverter plate, bottle containers conveyed through the feed section 78 of the diverter assembly will pass through the first directional slot 190 to the first output approach slot 142 where they subsequently will be fed to the first output air conveyor 12. On operation of the valve housing 174 to cause the diverter plate 160 to move to its second position relative to the slide rods 164 supporting the plate, the second directional slot 196 will align with the feed slot 92 and the second output approach slot 148. In this position of the diverter plate 160 relative to its slide rods 164, bottle containers conveyed through the feed sections 78 of the diverter assembly will pass through the second directional slot 196 to the second output approach slot 148 on their way to the second output air conveyor 14. The movement of the diverter plate 160 laterally across the diverter assembly between its first and second positions can be automatically controlled to redirect a single bottle container at a time to one of the two output approach slots 142, 148 and their associated output air conveyors, or can be controlled to direct pluralities of bottle containers at a time to one of the two output approach slots.

A pair of side jets 204, 206 are shown in FIG. 2 and can be seen in FIG. 5 of the drawing figures. These side jets assist in directing bottle containers passing through the directional slots 190, 196 of the diverter plate to the selected output approach slot 142, 148. The two side jets 204, 206 are supplied with pressurized air through hoses 208, 210 that communicate with the manifold 190. An electrically operated gate valve 212, 214 is positioned between each of the side jets 204, 206 and the hose 208, 210 supplying them with pressurized air. On selective operation of the gate valves 212, 214, jets of air can be ejected from the side jets 204, 206. The side jets are positioned so that an ejected jet of air will strike against the bottom of a bottle container passing through the diverter plate directional slots 190, 196 to move the bottom of the bottle container toward the chosen output approach slot 142, 148. For example, in the relative position of the diverter plate 160 to the feed section 78 and output approach section 80 of the assembly shown in FIG. 2, the lower gate valve 214 shown in FIG. 2 would be automatically operated to eject a jet of air that would strike against the body of a bottle container as it passes through the first directional slot 190 on its way to the first output approach slot 42 thereby ensuring that the body of the bottle container conveyed through the first directional slot 190 of the diverter plate follows the neck of the container passing through the slot on its way to the first output approach slot 142 of the output approach section 80. By providing the side jets 204, 206 to assist in redirecting the bottle containers to their selected output approach slots, jams in the diverter plate directional slots and in the output approach section slots are avoided. Also shown in FIG. 5 are pairs of side rails 216, 218 against which the bodies of bottle containers conveyed into the output approach slots 142, 148 may engage to prevent wobbling of the bottle containers as they pass through these slots and thereby prevent jamming of the containers.

With the apparatus of the invention described above, pluralities of bottle containers can be quickly conveyed from one location to another while avoiding jamming of the bottles in the air conveyors of the invention and also avoiding damage to the bottles due to high speed impact with bottles that have stopped or slowed. With the diverter assembly of the invention, the conveyed bottles can be quickly branched off to other air conveyor paths in an orderly and systematic manner.

While the present invention has been described by reference to a specific embodiment, it should be understood that modifications and variations of the invention may be constructed without departing from the scope of the invention defined in the following claims.

What is claimed is:

1. A conveyor for conveying containers, each container having a body, the conveyor comprising:

an input conveyor having a length extending in a downstream direction;

at least two separate output conveyors each having a length extending in the downstream direction; and a diverter positioned between the input conveyor and the output conveyors, the diverter being selectively moveable for conveying the containers from the input conveyor to the output conveyors and selectively directing the containers from the input conveyor to one of the output conveyors, the diverter having at least two laterally spaced support surfaces configured to support the containers as the containers are conveyed along the diverter, the support surfaces defining a directional slot, the support surfaces and the directional slot all remaining fixed relative to one another while the diverter is moved.

2. The conveyor of claim 1 wherein:

the diverter includes a plate that is selectively movable laterally relative to the input and output conveyors, the plate having at least one directional slot, the directional slot being configured to connect one of the output conveyors with the input conveyor when the plate is laterally positioned.

3. The conveyor of claim 1 wherein:

the diverter further includes a plurality of selectively operable nozzles positioned to direct air against the containers being conveyed along the diverter toward one of said at least two output conveyors to convey the containers from the input conveyor to the one output conveyor when at least one of the plurality of nozzles is selectively operated.

4. The conveyor of claim 3 wherein:

the plurality of selectively operable nozzles are positioned so that the jets of air elected from the nozzles strike against a bottom portion of the body of each container passing through the diverter to move the bottom portion of the body of each container toward one of said at least two output conveyors.

5. An air conveyor for conveying containers, the conveyor comprising:

an input air conveyor having a length extending in a downstream direction, the input air conveyor having a plurality of air jet openings spatially arranged along the length;

a plurality of separate output air conveyors each having a length extending in the downstream direction, each output air conveyor having a plurality of air jet openings spatially arranged along the length thereof; and a diverter positioned between the input air conveyor and the plurality of output air conveyors, the diverter being selectively moveable for conveying the containers between the input air conveyor and the output air conveyors and selectively directing the containers from the input air conveyor to at least one of the output air conveyors, the diverter having at least two laterally spaced support surfaces configured to support the containers as the containers are conveyed along the diverter, the support surfaces defining a directional slot, the support surfaces and the directional slot all remaining fixed relative to one another while the diverter is moved.

6. The air conveyor of claim 5 wherein:

the diverter includes a plate selectively movable between a plurality of lateral positions, the plate having a plurality of directional slots each of which corresponds to one of the plurality of output air conveyors, each directional slot being configured to connect the output air conveyor to which it corresponds with the input air conveyor when the plate is laterally positioned so that each directional slot is aligned with the output air conveyor to which it corresponds.

7. The air conveyor of claim 5 wherein:

the diverter further includes a plurality of selectively operable nozzles, each nozzle being positioned to direct air against the containers being conveyed along the diverter toward a corresponding output air conveyor to convey the containers from the input air conveyor to the corresponding output air conveyor when at least one of the plurality of nozzles is selectively operated.

8. The air conveyor of claim 5 further comprising:

a photosensor mounted on one side of the input air conveyor at a downstream end prior to the diverter; and a reflector positioned opposite the photosensor on an opposite side of the input air conveyor at the downstream end of the input air conveyor.

9. The air conveyor of claim 8 wherein:

the photosensor is connected in communication with means for counting and timing containers passing between the photosensor and the reflector as the containers exit the input air conveyor and enter the diverter, and with means for monitoring a rate at which the containers exit the input air conveyor and enter the diverter and a spacing of the containers in relation to one another.

10. An air conveyor apparatus for conveying containers, each container having a neck, a neck ring having an outer diameter dimension, a shoulder below the neck ring, and a body below the shoulder, the conveyor apparatus comprising:

an input air conveyor having a pair of mutually opposed, laterally spaced flanges defining an elongated input slot therebetween, the input slot being dimensioned to receive the containers in the input slot supported on the pair of flanges, the input slot extending between the pair of flanges in a downstream direction, and a plurality of air jet openings spatially arranged along the pair of flanges on opposite sides of the input slot;

first and second, separate, output air conveyors each having a pair of mutually opposed, laterally spaced flanges defining elongated first and second output slots, respectively, therebetween, each output slot being dimensioned to receive the containers therein with the neck rings of the containers in the output slot supported on the pair of flanges thereof, each output slot extending between the pair of flanges thereof in a downstream direction and each output air conveyor having a plurality of air jet openings spatially arranged along the pair of flanges thereof on opposite sides of the output slot thereof; and a diverter positioned between the input air conveyor and the first and second output air conveyors, the diverter being selectively moveable for diverting the containers conveyed in the downstream direction by the input conveyor to a selected one of the first and second output air conveyors, the diverter having at least two laterally spaced flanges configured to support the container neck rings as the containers are conveyed along the diverter, the flanges of the diverter defining a directional slot therebetween, the directional slot being dimensioned to receive the containers in the input slot supported on the flanges of the diverter, the flanges and the directional slot of the diverter all remaining fixed relative to one another while the diverter is moved.

11. The air conveyor apparatus of claim 10, wherein:

the diverter includes a plate positioned between the input air conveyor and the first and second output air conveyors, the plate having first and second, separate, directional slots, the plate being selectively movable laterally between first and second positions relative to the input air conveyor and the first and second output air conveyors where in the first position of the plate the first directional slot aligns with the input slot and the first output slot and in the second position of the plate the second directional slot aligns with the input slot and the second output slot.

12. The air conveyor apparatus of claim 10, wherein:

the diverter further includes first and second nozzles that are selectively controlled to eject jets of air in opposite lateral directions where the first nozzle directs the containers conveyed in the downstream direction by the input conveyor to the first output air conveyor and the second nozzle diverts the containers conveyed in the downstream direction by the input air conveyor to the second output air conveyor.

13. The air conveyor apparatus of claim 12, wherein:

the first and second nozzles are laterally positioned on opposite sides of the diverter and are aimed towards the diverter.

14. The air conveyor apparatus of claim 12, wherein:

the first and second nozzles are positioned so that the jets of air ejected from the nozzles strike against a bottom portion of the body of each container passing through the diverter to move the bottom portion of the body of each container towards the selected one of the first and second output air conveyors.

15. An air conveyor for conveying containers, each container having a neck ring with an outer diameter dimension, the conveyor comprising:

an feed air conveyor having at least two laterally spaced feed surfaces configured to support the container neck rings as the containers are conveyed along the feed conveyor, the surfaces defining a feed slot having a width smaller than the neck ring outer diameter dimensions for guiding the containers along the feed conveyor, the feed air conveyor including a plurality of air nozzles positioned along the feed conveyor for blowing air against the containers to move the containers along the feed conveyor in a downstream direction;

an output air conveyor having at least three laterally spaced output surfaces configured to support the container neck rings as the containers are conveyed along the output conveyor, the output surfaces defining at least two output slots each having widths smaller than the neck ring outer diameter dimensions for guiding the containers along the output conveyor, the output air conveyor including a plurality of air nozzles positioned along the output conveyor for blowing air against the containers to move the containers along the output conveyor in the downstream direction; and a diverter positioned between the feed and output air conveyors for conveying the containers between the feed and output air conveyors, the diverter having a channel defined by at least two laterally spaced support surfaces configured to support the container neck rings as the containers are conveyed along the diverter, the diverter being moveable for selectively directing the containers from the feed air conveyor to at least one of the output slots of the output air conveyor, the channel and the support surfaces of the diverter all remaining fixed relative to one another while the diverter is moved for selectively directing the containers from the feed air conveyor to at least one of the output slots of the output air conveyor.

16. The air conveyor of claim 15 wherein:

the diverter further includes a plurality of air nozzles positioned along the diverter for blowing air against the containers to move the containers along the diverter in the downstream direction.

17. The air conveyor of claim 15 wherein:

the diverter includes a plate selectively moveable between first and second positions, the plate having first and second directional slots, the first directional slot being configured to connect the feed slot with a first one of the output slots when the plate is in the first position for conveying the containers between the feed air conveyor and the first output slot of the output air conveyor, and the second directional slot being configured to connect the feed slot with a second one of the output slots when the plate is in the second position for conveying the containers between the feed air conveyor and the second output slot of the output air conveyor.

18. The air conveyor of claim 15 wherein:

the diverter further includes first and second laterally directed and selectively operable nozzles, the first nozzle being positioned to direct air against the containers being conveyed along the diverter toward a first one of the output slots to convey the containers from the feed air conveyor to the first output slot of the output air conveyor when the first nozzle is selectively operated, and the second nozzle being positioned to direct air against the containers being conveyed along the diverter toward a second one of the output slots to convey the containers from the feed air conveyor to the second output slot of the output air conveyor when the second nozzle is selectively operated.

19. The air conveyor of claim 15 further comprising:

a lower air jet for directing air at the containers as the containers enter the diverter, the air jet being configured to direct air at the containers in a direction which is upward and opposite the downstream direction.

20. The air conveyor of claim 15 further comprising:

an upper air jet for directing air at the containers as the containers enter the diverter, the air jet being configured to direct air at the containers in a downward direction.

21. An air conveyor apparatus for conveying containers, each container having a neck ring and a shoulder below the neck ring, each neck ring having an outer diameter dimension, the conveyor apparatus comprising:

an input air conveyor having a pair of mutually opposed, laterally spaced flanges defining an elongated input slot therebetween, the input slot being dimensioned to receive the containers in the input slot supported on the pair of flanges, the input slot extending between the pair of flanges in a downstream direction, and a plurality of air jet openings spatially arranged along the pair of flanges on opposite sides of the input slot;

first and second, separate, output air conveyors each having a pair of mutually opposed, laterally spaced flanges defining elongated first and second output slots, respectively, therebetween, each output slot being dimensioned to receive the containers therein with the neck rings of the containers in the output slot supported on the pair of flanges thereof, each output slot extending between the pair of flanges thereof in a downstream direction and each output air conveyor having a plurality of air jet openings spatially arranged along the pair of flanges thereof on opposite sides of the output slot thereof; and a diverter positioned between the input air conveyor and the first and second output air conveyors, the diverter being selectively moveable for diverting the containers conveyed in the downstream direction by the input conveyor to a selected one of the first and second output air conveyors, the diverter having at least two laterally spaced flanges configured to support the container neck rings as the containers are conveyed along the diverter, the flanges of the diverter remaining fixed relative to one another while the diverter is moved, and wherein the diverter further includes first and second diverter nozzles that are selectively controlled to eject jets of air in opposite lateral directions where the first diverter nozzle directs the containers conveyed in the downstream direction by the input conveyor to the first output air conveyor and the second diverter nozzle diverts the containers conveyed in the downstream direction by the input conveyor to the second output air conveyor.

22. The air conveyor apparatus of claim 21, wherein:

the diverter further includes a diverter plate positioned between the input air conveyor and the first and second output air conveyors, the diverter plate having first and second, separate, directional slots, the plate being selectively shiftable laterally between first and second positions of the diverter plate relative to the input air conveyor and the first and second output air conveyors where in the first position of the diverter plate the first directional slot aligns with the input slot and the first output slot and in the second position of the diverter plate the second directional slot aligns with the input slot and the second output slot.

23. An air conveyor for conveying containers, each container having a neck, a neck ring having an outer diameter dimension, a shoulder below the neck, and a body below the shoulder, the air conveyor comprising:

an input conveyor having a pair of mutually opposed, laterally spaced flanges defining an elongated input slot therebetween, the input slot being dimensioned to receive the containers therein with the neck rings of the containers in the input slot supported on the pair of flanges, the input slot extending between the pair of flanges in a downstream direction, and a plurality of air jet openings spatially arranged along the pair of flanges on opposite sides of the input slot;

a plurality of separate output conveyors each having a pair of mutually opposed, laterally spaced flanges defining a plurality of elongated output slots, respectively, therebetween, each output slot being dimensioned to receive the containers therein with the neck rings of the containers in the output slot supported on the pair of flanges thereof, each output slot extending between the pair of flanges thereof in a downstream direction, and each output conveyor having a plurality of air jet openings spatially arranged along the pair of flanges thereof on opposite sides of the output slot thereof; and a diverter positioned between the input conveyor and the plurality of output conveyors, the diverter being selectively moveable for conveying the containers between the input conveyor and the output conveyors and selectively directing the containers from the input conveyor to at least one of the output conveyors, the diverter having at least two laterally spaced flanges configured to support the container neck rings as the containers are conveyed along the diverter, the flanges of the diverter remaining fixed relative to one another while the diverter is moved, and wherein the diverter further includes a plurality of selectively operable nozzles, the plurality of nozzles being positioned to direct air against the containers being conveyed along the diverter toward one of the plurality of output slots to convey the containers from the input conveyor to the one of the plurality of output slots when at least one of the plurality of nozzles is selectively operated.

24. The air conveyor of claim 23 wherein:

the diverter further includes a plate selectively movable between a plurality of lateral positions, the plate having a plurality of directional slots each of which corresponds to one of the plurality of output slots, each directional slot being configured to connect the corresponding output slot thereof with the input slot when the plate is laterally positioned so that each directional slot is aligned with the corresponding output slot thereof.

25. The air conveyor of claim 23 further comprising:

an upper air jet for directing air at the containers as the containers enter the diverter, the upper air jet being configured to direct air at the containers in a direction which is downward, thereby preventing the neck rings from rising up off the flanges.

26. An air conveyor for conveying containers, each container having a neck, a neck ring having an outer diameter dimension, a shoulder below the neck, and a body below the shoulder, the air conveyor comprising:

an input conveyor having a pair of mutually opposed, laterally spaced flanges defining an elongated input slot therebetween, the input slot being dimensioned to receive the containers therein with the neck rings of the containers in the input slot supported on the pair of flanges, the input slot extending between the pair of flanges in a downstream direction, and a plurality of air jet openings spatially arranged along the pair of flanges on opposite sides of the input slot;

a plurality of separate output conveyors each having a pair of mutually opposed, laterally spaced flanges defining a plurality of elongated output slots, respectively, therebetween, each output slot being dimensioned to receive the containers therein with the neck rings of the containers in the output slot supported on the pair of flanges thereof, each output slot extending between the pair of flanges thereof in a downstream direction, and each output conveyor having a plurality of air jet openings spatially arranged along the pair of flanges thereof on opposite sides of the output slot thereof;

a diverter positioned between the input conveyor and the plurality of output conveyors, the diverter being selectively moveable for conveying the containers between the input conveyor and the output conveyors and selectively directing the containers from the input conveyor to at least one of the output conveyors, the diverter having at least two laterally spaced flanges configured to support the container neck rings as the containers are conveyed along the diverter, the flanges of the diverter remaining fixed relative to one another while the diverter is moved; and a lower air jet for directing air at the containers as the containers enter the diverter, the lower air jet being configured to direct air at the containers in a direction which is upward and opposite the downstream direction.

27. The air conveyor of claim 26 wherein:

the lower air jet is configured to eject a jet of air which impinges on the body of each container being conveyed along the input slot, thereby serving to orient each container with the neck thereof positioned slightly forward of the body of the container so that each container is positioned in a forward orientation as it is conveyed from the input slot to the diverter.

28. The air conveyor of claim 27 further comprising:

an upper air jet for directing air at the containers as the containers enter the diverter, the upper air jet being configured to eject a jet of air which impinges on the neck and shoulder of each container being conveyed along the input slot, the upper air jet in combination with the lower air jet thereby serving to orient each container with the neck thereof positioned slightly forward of the body of the container so that each container is positioned in a forward orientation as it is conveyed from the input slot to the diverter.

* * * * *